April 30, 1929.  A. E. SMITH  1,711,183
TOOTHBRUSH
Filed March 18, 1926
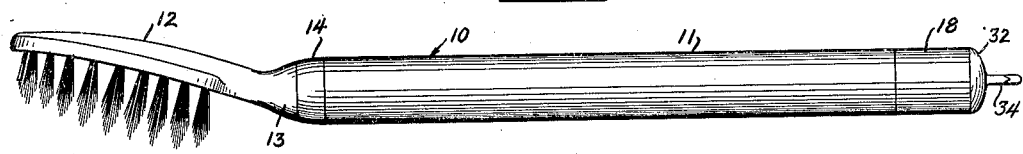
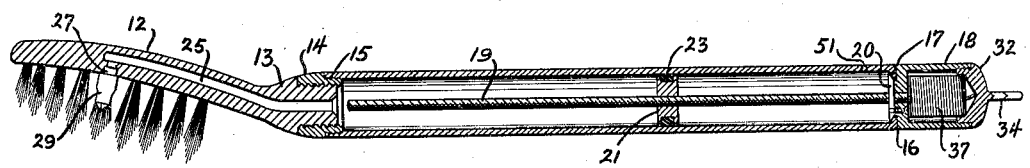
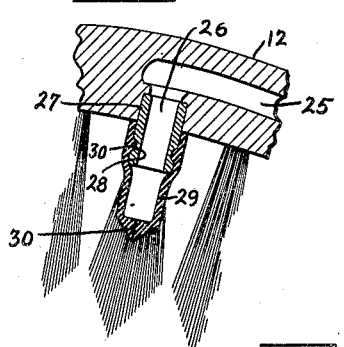
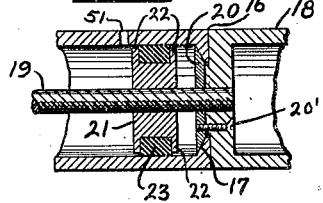
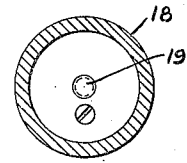
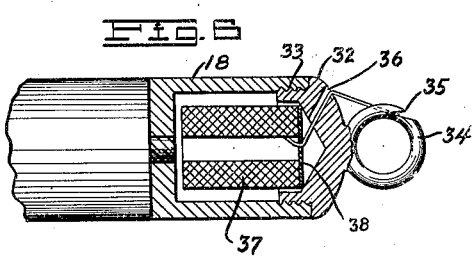
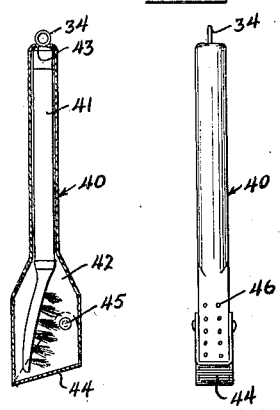
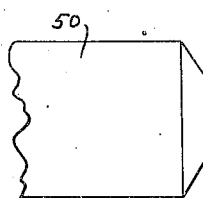
INVENTOR.
ARTHUR E. SMITH
BY
ATTORNEY.

Patented Apr. 30, 1929.

1,711,183

UNITED STATES PATENT OFFICE.

ARTHUR E. SMITH, OF LOS ANGELES, CALIFORNIA.

TOOTHBRUSH.

Application filed March 18, 1926. Serial No. 95,567.

This invention relates to tooth brushes.

The general object of the invention is to provide an improved fountain tooth brush wherein the dentifrice is stored in the handle and wherein novel means is provided for forcing the dentifrice from the handle onto the bristles of the brush.

Another object of the invention is to provide a tooth brush having a dental floss receptacle in the handle thereof.

A further object of the invention is to provide a tooth brush wherein a hollow reservoir is provided in the handle and wherein two receptacles are associated with the handle, one receptacle serving to hold tooth paste and the other receptacle serving to hold dental floss.

An additional object of the invention is to provide a novel container for dental floss which is particularly adapted for positioning on the handle of a tooth brush.

A further object of the invention is to provide a novel valve for the discharge opening of a fountain brush.

An additional object of my invention is to provide a novel marking means for distinguishing different tooth brushes.

Other objects of the invention will be apparent from the following description taken in connection with the accompanying drawing, wherein:

Fig. 1 is a side elevation of a tooth brush embodying the features of my invention;

Fig. 2 is a longitudinal central sectional view showing the tooth brush;

Fig. 3 is an enlarged sectional detail;

Fig. 4 is an enlarged central sectional view showing the details of the moving plunger;

Fig. 5 is an end view of the tooth paste holding tube;

Fig. 6 is an enlarged sectional view showing the details of the dental floss holder;

Fig. 7 is a sectional view showing the manner of filling the tooth paste reservoir;

Fig. 8 is a sectional view showing a receptacle for my improved tooth brush, and Fig. 9 is an elevation of the receptacle.

Referring to the drawing by reference characters, I have indicated a tooth brush generally at 10.

In the following description I have described my invention as particularly adapted for use in tooth brushes, although it will be understood that it is equally adapted for other purposes. It will also be understood that in the following description I have described a specific shape of tooth brush, but it will be understood that the shape and size as well as other variations may be made without departing from the spirit of my invention.

The tooth brush as shown comprises a handle portion 11 and a body portion 12. The handle portion is shown as made from a hollow cylindrical tube which may be made of composition or any other material. It may be transparent, translucent or opaque as desired.

The body or bristle portion 12 of the brush may be made of any desired material. The bristles may be secured in the head in any desired manner. One end of the body indicated at 13 is screw threaded to a collar or boss 14 and the handle or tube 15 is also screw threaded into this collar or boss 14 as shown in Fig. 2. At one end 16 of the tube I provide an interior flange 17 which is preferably integral with the tube and which may have a tapered inner wall as shown.

Arranged upon the end 16 of the tube I show a hollow receptacle 18. This receptacle is secured to turn with a threaded rod 19 which may be made of metal or other suitable material. The threads on the rod 19 are triple threads so that an extremely fast movement is provided for a purpose which will presently be apparent. Arranged adjacent the inner end of the handle 11 I show a disc 20 which has a beveled surface thereon engaging on the bevel of the flange 17. This disc 20 is arranged adjacent the end of the receptacle 18 and engages a boss on the end of the receptacle 18 as clearly shown in Fig. 4. A screw 20' serves to hold the disc 20 in engagement with the boss on the receptacle 18.

Mounted upon the rod 19 I show a plunger 21. This plunger preferably comprises a one-piece member which has flanges 22 adjacent each side thereof. Between these flanges I may insert a one-piece rubber band 23 to serve as a gasket. It will be understood, however, that the flanges 22 may be made separate and may be secured to the central portion if desired, and that in place of the gasket 23 I may use cork or other material.

The plunger 21 is threaded to the rod 19 so that as this rod is turned the plunger will move along the barrel 11. The body 12 is provided with an orifice 25 which communicates with the lateral orifice 26. This orifice 26 is provided with a bushing 27 which is shown as provided with a groove 28, and upon this bushing 27 I arrange a valve member 29. This valve member 29 is preferably made of rubber and may be provided with a boss 30 which fits within the groove 28 just mentioned. The end of the valve member 29 is tapered and is thickened as at 31 and this end portion is slitted as shown, after the member is vulcanized to provide an automatic valve through which the tooth paste may be forced in a thin ribbon.

The valve 29 is soft and flexible and will remain open so long as pressure is maintained within the handle, but will close when the pressure drops. The valve is arranged between the tiers of bristles so that it will not be in the way when the brush is used.

The receptacle 18 is provided with a cap 32 which is threaded to the body by threads 33. This cap 32 is provided with an eyelet or other member 34 by which the brush may be suspended and which may serve to turn the cap. This eyelet 34 is notched or serrated as at 35 and the face of the notch is sharpened for a purpose to be presently described.

The cap 32 is provided with a recess 36 and within the receptacle I arrange a spool of dental floss 37. As shown this floss is wound so that it will, as it is withdrawn, unwind from the interior of the roll although other arrangements may be effected, as will be apparent. I prefer to cover one end of the floss spool with a piece of adhesive tape 38 and through this tape the floss extends. The engagement of the floss with the tape will prevent accidental withdrawal of the floss and will assist in cutting off the floss as used. The floss will pass through the opening 36 and may be cut off in the notch 35 as described.

I prefer to make the cap members 18 of a distinct color which will be quite different from the color of the handle 11 so that by using various colors the ownership of individual brushes may be identified. Instead of having the end of the brush colored I may color an intermediate portion, if this is found to be more desirable, although at present I now prefer to color merely the end portion of the receptacle 18.

In Fig. 8 I show a receptacle for storing or shipping the brush. This receptacle is designated 40 and comprises a body having one portion 41 of a suitable size to accommodate the handle of the brush while the rest of the body is larger as at 42 to accommodate the bristles. The part 41 has an aperture 43 through which the holding member 34 projects.

The end of the portion 42 is bevelled and is provided with a cover 44 pivoted at 45 so that it may swing from an open to a closed position. The receptacle 40 may be made of celluloid or other suitable material. I prefer to provide vent holes 46 to allow the brush to dry.

In filling the tooth brush the bristle portion 12 is unscrewed from the collar 14 and a tube of tooth paste 50 is screwed to this collar 14. The receptacle 18 is turned to move the plunger 21 to the end of the handle. This operation uncovers a vent opening 51 in the handle and as the paste fills the handle the air will escape through this vent opening. As soon as the handle is filled, which will be indicated by the paste appearing at the vent opening 51, the container 50 will be removed and the bristle portion 12 replaced. The member 18 will then be turned slightly causing the vent opening 51 to be closed and thus preparing the brush for use.

When the user desires to use the brush, he will moisten the bristles and after this is done, he will turn the operating member 18, thereby causing the plunger 21 to move along the inside of the handle. This movement will cause some of the tooth paste to pass through the aperture 25 and through the collar 27, whence it will pass to the valve member 29. The valve in the member 29 is normally held closed by the inherent properties in the rubber but as soon as the pressure in this member 29 is increased the valve will automatically open so that a thin ribbon of the tooth paste will be presented on the tips of the bristles. I prefer to arrange the threads so that a single rotation of the operating member will supply a sufficient quantity of the tooth paste for each operation. After the user is through with the brush he will wash it in the usual manner. This will cause the tooth paste to be removed from the valve so that this valve may close automatically thereby sealing the tooth paste within the valve member 29 so that a fountain tooth brush which is entirely sanitary is provided. After brushing his teeth, the user will preferably place the brush in the container 40 as will be readily understood.

From the foregoing description it will be apparent that I have provided an improved tooth brush which can be economically manufactured, which is highly efficient in use, and which is thoroughly sanitary.

Having thus described my invention, I claim:

1. In a tooth brush having a bristle retaining member, a hollow handle portion having an open end, a plunger in said hollow handle, an inwardly extending flange having an inclined lower face on said open end, a closure for said open end resting on the outer face of said flange and means for holding said cover on said flange, said means comprising a disk on the interior of said handle and resting against the inclined face of the flange and a plunger operating rod attached to the disk and the closure.

2. In a tooth brush including a bristle retaining member, a hollow handle, an ejecting plunger movable therein, said handle having a filling opening at the lower end thereof and a vent opening adjacent the upper end thereof, said opening being spaced from the end a distance greater than the thickness of the plunger, whereby communication is established between the outer air and the hollow handle when the plunger is in its extreme upper position.

In testimony whereof, I hereunto affix my signature.

ARTHUR E. SMITH.